(12) United States Patent  (10) Patent No.: US 7,189,472 B2
Suenaga et al.  (45) Date of Patent: Mar. 13, 2007

(54) FUEL CELL, ELECTRODE FOR FUEL CELL AND A METHOD OF MANUFACTURING THE SAME

(75) Inventors: Seiichi Suenaga, Kanagawa-ken (JP); Maki Yonetsu, Kanagawa-ken (JP); Norihiro Tomimatsu, Kanagawa-ken (JP); Hideyuki Ohzu, Kanagawa-ken (JP); Yasuhiro Goto, Tokyo (JP); Yoshihiko Nakano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 10/107,412

(22) Filed: Mar. 28, 2002

(65) Prior Publication Data

US 2002/0177032 A1  Nov. 28, 2002

(30) Foreign Application Priority Data

Mar. 28, 2001 (JP) .............................. 2001-094154
Mar. 29, 2001 (JP) .............................. 2001-097462

(51) Int. Cl.
*H01M 4/86* (2006.01)
*H01M 4/88* (2006.01)
*H01M 4/96* (2006.01)

(52) U.S. Cl. ........................... 429/44; 429/42; 502/101
(58) Field of Classification Search ................. 429/42, 429/44; 502/101
See application file for complete search history.

(56) References Cited

U.S. PATENT DOCUMENTS 4,770,867 A  9/1988 Coulon et al.
5,691,054 A * 11/1997 Tennent et al. ............. 428/359
5,800,706 A * 9/1998 Fischer .................... 210/198.2

(Continued)

FOREIGN PATENT DOCUMENTS

EP  308929 A1 * 3/1989

(Continued)

OTHER PUBLICATIONS

C. M. Lukehart, et al., "Preparation of Pt—Ru or Pt—Mo Supported Catalysts for PEM or Direct Methanol Fuel Cells from Single-Source Molecular Precursors", Am. Chem. Soc., Div. Fuel Chem., 44 (4), pp. 982-986, 1999.

(Continued)

*Primary Examiner*—Gregg Cantelmo
(74) *Attorney, Agent, or Firm*—Oblon, Spivak, McClelland, Maier & Neustadt, P.C.

(57) ABSTRACT

An electrode for a fuel cell, including a porous catalytic carrier including conductive fibers having two particle diameter distribution peaks of a first particle diameter distribution peak existing at a small particle diameter side and a second particle diameter distribution peak existing at a large particle diameter side, wherein said conducting fibers are carbon nano-fibers formed from a catalyst for formation prepared by preparing a mixed powder including one or more of a reducible metallic oxide powder and a non-reducible metallic oxide powder, mixing and pulverizing the mixed powder, and heating the mixed powder under reducing atmosphere; catalyst to be carried on said conductive fibers belonging to the first particle diameter distribution peak; and a proton conductive material adhered on surface of at least the conducive fibers belonging to the first particle diameter distribution peak, so as to come into contact with the catalyst.

7 Claims, 5 Drawing Sheets

U.S. PATENT DOCUMENTS

2003/0134179 A1 * 7/2003 Gascoyne et al. ............ 429/44

FOREIGN PATENT DOCUMENTS

| EP | 902716 B1 * | 11/2000 |
| --- | --- | --- |
| JP | 61-500561 | 3/1986 |
| JP | 62-500943 | 4/1987 |
| JP | 2000-281303 | 10/2000 |
| WO | WO 86/03455 | 6/1986 |
| WO | WO 00/47816 A1 * | 9/2000 |
| WO | WO 00/55933 A1 * | 9/2000 |
| WO | WO 01/80342 A1 * | 10/2001 |

OTHER PUBLICATIONS

U.S. Appl. No. 09/947,511, filed Sep. 7, 2001, Nakano et al.
U.S. Appl. No. 10/107,412, filed Mar. 28, 2002, Suenaga et al.
U.S. Appl. No. 11/370,852, filed Mar. 9, 2006, Mei et al.

* cited by examiner

FUEL CELL, ELECTRODE FOR FUEL CELL AND A METHOD OF MANUFACTURING THE SAME

BACKGROUND OF THE INVENTION

1. Field of the Invention

The present invention relates to an electrode for a fuel cell and the fuel cell, and more particularly to the fuel cell using carbon nano-fiber as a catalyst carrier and the fuel cell using this electrode.

2. Description of the Related Art

The fuel cells generate few amount of carbon dioxide and, in recent years, have attracted public attention as a power generation technology having few environmental loading.

The fuel cells are usually of a structure of laminating in order a current collector for a cathode/a catalytic layer for the cathode/an electrolyte film of proton conductivity/an anode catalytic layer and/a current collector for the anode.

The catalytic layer for the electrode (the catalytic layer for the cathode or the catalytic layer for the anode) is required to have electronic conductivity between the catalytic layer for the electrode and the current collector and proton conductivity between the catalytic layer for the electrode and the electrolyte film in addition to hold the sufficient amount of catalytic particles in order to obtain a catalytic function. For this reason, heretofore in the past, a catalytic layer of some tens μm has been formed by mixture of conductive particles having a particle diameter of about 50 nm carried with the catalyst and the proton conductor.

In the catalytic layer for the electrode having such a constitution, for example, an electron formed by the catalyst which is located in the vicinity of an electrolyte film does not reach the current collector unless it moves among a plurality of conductive particles. However, because a contact area among conductive particles is small and a proton conductive material exists among the particles as the case may be, electrical resistance between the conductive particles is high. That is, the conventional catalytic layer is low in electronic conductivity between the current collector and the catalyst layer for the electrode, thereby lowering power generation efficiency.

Further, by densifying the catalytic layer, it is possible to enhance electronic conductivity between the current collector and the catalytic layer for the electrode. However, when the catalytic layer is densified, because diffusion of the fuel or an oxidizer into the catalytic layer is lowered, there occurs a problem that the catalytic function of the catalytic particle cannot be sufficiently utilized.

On the other hand, as a technology regarding the catalyst, there has been a report that the carbon fiber is used as a catalyst carrier and the catalytic particle is carried on this carbon fiber surface (E. Theorid et al: Electrochem. Acta., Vol. 38, No.6, P.793(1993)).

When the carbon fiber carried with the catalytic particle is fabricated and the electrode in which this carbon fiber is temporarily deposited on the current collector surface is adopted for the fuel cell, even if a probability of the electron formed in the vicinity of an electrolyte film moving among the particles (among fibers) during its movement to the current collector is lowered, several times of movements among the particles are usually necessary and it is very difficult to sufficiently enhance the electronic conductivity.

Heretofore in the past, the point that counts much in preparing the electrode for the fuel cell is to have a micro-sized catalyst having a large specific surface area contained in high-density so that high output power can be obtained.

In order to prepare such an electrode, for example, the catalyst was formed on a carbon particle surface, so that it became possible to have the catalyst carried on the catalyst carbon particle surface of nano order in high density.

In order to improve the output of the fuel cell, it is important not only to improve activity in the above described catalyst, but also to improve diffusion of the fuel or oxygen into the inside of the electrode. The conventional electrode uses a small-sized carbon black having a large specific surface area as a carrier so as to allow as many catalysts as possible to bear. For this reason, it is practically impossible to control pores of the electrode layer with a result that a small-sized dense electrode having small porosity and pore-size comes out.

That is, though the amount of the catalyst per unit volume increases, because porosity and pore-size in the electrode are small, it becomes difficult for oxygen and the fuel to be supplied into the inside of the electrode, and there occurs a problem that service efficiency of the catalyst which exists inside the electrode is lowered.

Furthermore, it is necessary for the electrode to have a conductive function for the electron generated by the catalyst or catalytic reaction, and from this viewpoint, the electrode using the conventional carbon black as the carrier is required to be made dense. Nevertheless, when the electrode is made dense as described above, diffusion of the fuel or oxygen into the inside of the electrode becomes poor.

In other words, in the case where the conventional carbon black is used as a carrier, it is difficult to realize an electrode, which satisfies three points such as high density of micro-catalyst, good diffusion of fuel and maintenance of an electronic conductive bus at the same time.

For example, it is described in Guangli Che (Nature Vol.393, p346 (1998)) that a carbon nano-tube is fabricated by using a template method and, by using this carbon nano-tube as a carrier, a minute catalyst is carried on the inner wall of the nano-tube.

However, because ununiformity of the catalyst toward the longitudinal direction of the nano-tube is recognized, this method is not sufficient enough to realize highdensity of the catalyst.

Although it is possible to make the electrode dense and enhance catalytic density by making the carbon nano-tube minute, diffusion of fuel and the like becomes poor. When a relatively large-sized carbon nano-tube is used, though diffusion of fuel and the like is improved, catalytic density is lowered.

On the other hand, when the anode electrode has high porosity and large-sized pores so as to improve diffusion of fuel, the supplied fuel passes through the anode electrode and further through the proton conductive film to reach the cathode electrode, and the fuel and oxygen end up to directly react there, thereby lowering power generation efficiency.

For this reason, it is necessary for the anode electrode not only to improve diffusion of the fuel, but also to lower permeability of the fuel. While it was not possible for the conventional anode electrode to enhance diffusion of the fuel and at the same time to lower permeability of the fuel.

As described above, because the conventional electrode to be used for the fuel cell is unable to enhance catalytic density and at the same time to enhance diffusion of the fuel, it was unable to develop high output of the fuel cell. Or, in the case of the anode electrode, it was not possible for the anode electrode to enhance diffusion of the fuel and at the same time to lower permeability of the fuel. Further, it was difficult for the conventional fuel cell electrode to sufficiently enhance conductivity of the catalytic layer and therefore to sufficiently enhance power generation efficiency of the fuel cell.

The prevent invention has been made in view of such problems and it is an object of the present invention to provide a fuel cell capable of outputting high power or an electrode for a fuel cell which makes it possible to output high power of the fuel cell. Further, it is an object of the present invention to provide the fuel cell having high power generation efficiency, the electrode for the fuel cell to achieve it and a manufacturing method of the electrode for the fuel cell to achieve it.

SUMMARY OF THE INVENTION

The electrode for the fuel cell according to the present invention comprises: a porous catalyst carrier comprising conductive fibers having two particle diameter distribution peaks, one of which is a first particle diameter distribution peak existing at a small particle diameterside, and the other one of which is a second particle diameter distribution peak existing at a large particle diameter side; a catalyst carried by the conductive fibers which belong at least to the first particle diameter distribution peak; and the proton conductive material adhered on the conductive fiber surface so as to contact the catalyst.

It is desirable that an aggregate of the conductive fibers which belong to the first particle diameter distribution peak is dispersed in a skeleton comprised by dispersing the conductive fibers which belong to the second particle diameter distribution peak.

It is desirable that the particle diameter value of the second particle diameter distribution peak is not less than five times the particle diameter value of the first particle diameter distribution peak.

The fuel cell according to the present invention, the fuel cell holding the proton conductive film between a pair of electrodes, has at least one of the electrodes which comprises a porous catalyst carrier comprising a conductive fibers having two particle diameter distribution peaks, one of which is a first particle diameter distribution peak existing at a small particle diameterside, and the other one of which is a second particle diameter distribution peak existing at a large particle diameter side; a catalyst carried by the conductive fibers which belong at least to the first particle diameter distribution peak; and the proton conductive material adhered on the conductive fiber surface so as to contact the catalyst.

The fuel cell according to the present invention, the fuel cell electrode comprising a porous body comprising the aggregate which includes the conductive material carrying the catalyst and the proton conductive material, has the porous body having two layers different in denseness of the porous body.

Another fuel cell electrode according to the present invention comprises: a current collector comprising a conductive porous body; a carbon nano-fiber having not less than 50% of the surface of the current collector with a top end portion thereof having not less than 45° angle of elevation; a catalyst for the electrode particles carried on the surface of the carbon nano-fiber; and a proton conductive member formed by contacting the catalyst for the electrode particles on the surface of the carbon nano-fiber.

The fuel cell according to the present invention, the fuel cell comprising an electrolyte film and a pair of electrodes holding this electrolyte film, has at least one electrode of the pair of electrodes which comprises: a current collector comprising a conductive porous body; a carbon nano-fiber having not less than 50% of the surface of the current collector with a top end portion thereof having not less than 45° angle of elevation; a catalyst for the electrode particles carried on the surface of the carbon nano-fiber; and a proton conductive member formed by contacting the catalyst for the electrode particles on the surface of the carbon nano-fiber.

A manufacturing method of the fuel cell electrode according to the present invention comprises the steps of: allowing a plurality of carbon precipitating catalysts to bear on the surface of the current collector comprising conductive perforate; forming a carbon nano-fiber which precipitated a carbon from the carbon precipitating catalyst by supplying carbon-containing source gas on the other surface of the porous current collector in relation to the surface on which the carbon precipitating catalyst of the porous current collector is carried; allowing the catalyst for the electrode particles to bear on the carbon nano-fiber; and forming the proton conductive layer on the carbon nano-fiber.

DETAILED DESCRIPTION OF THE PREFERRED EMBODIMENTS

Figure 1:
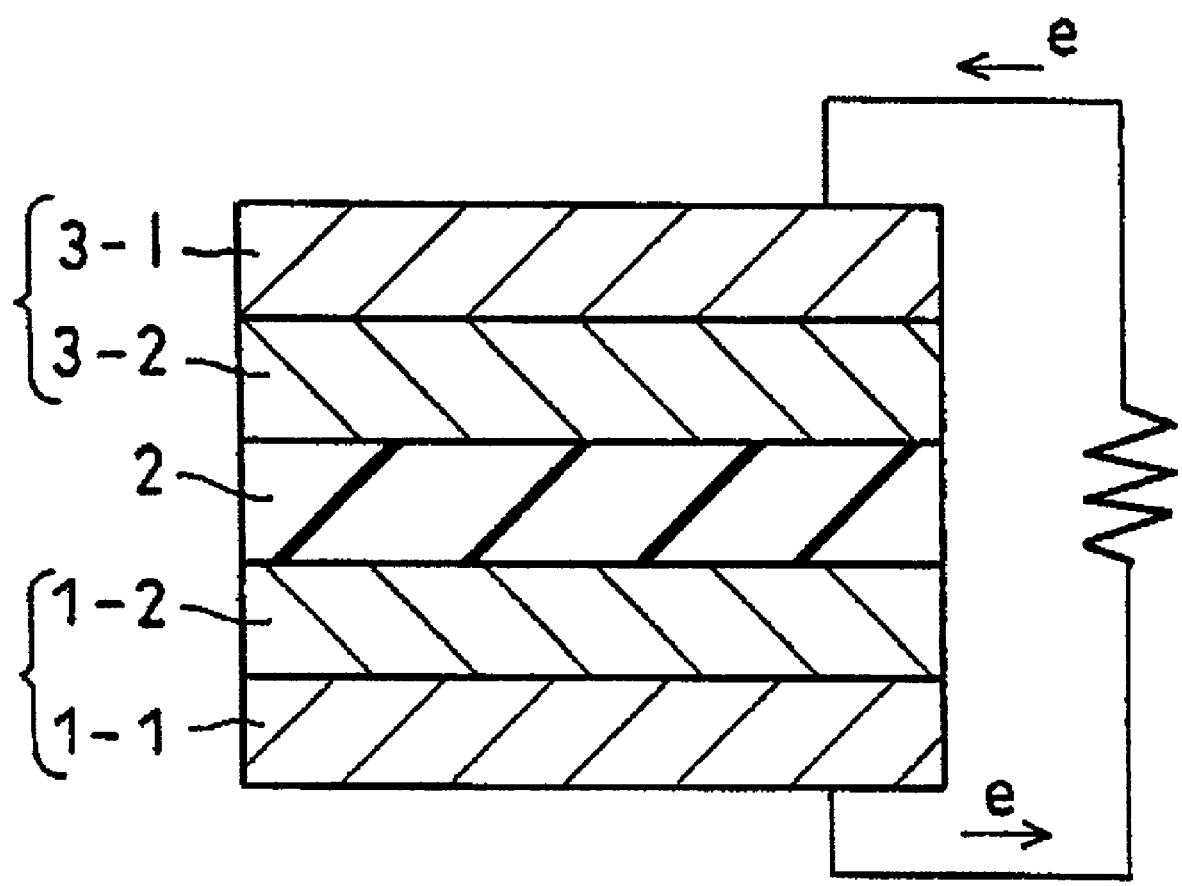
FIG. 1 is a drawing to show one example of a fuel cell according to the present invention.

First, one example of the fuel cell of the present invention will be shown in FIG 1.

In FIG. 1, the fuel cell is constituted by laminating in order an anode electrode 1, a proton conductive film 2 comprising a fluorine system high polymer having sulfonic group and a cathode electrode 3.

Further, the anode electrode 1 and the cathode electrode 3 shown in FIG. 1 are formed by a current collector 1-1 and a catalytic layer 1-2, and a current collector 3-1 and a catalytic layer 3-2, respectively.

For example, when a mixed fuel comprising methanol and water is supplied to the anode electrode 1 and an oxidizer gas (air and oxygen gas) is supplied to the cathode electrode 3, catalytic reactions shown in a chemical formula (1) and the chemical formula (2) occur in respective catalytic layers 1-2, 3-2.

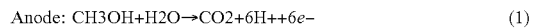

Anode: $CH_3OH + H_2O \rightarrow CO_2 + 6H^+ + 6e^-$ (1)

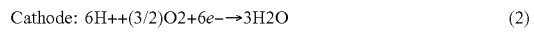

Cathode: $6H^+ + (3/2)O_2 + 6e^- \rightarrow 3H_2O$ (2)

In this way, proton generated at the anode catalytic layer 1-2 moves to a proton conductive film 2, and an electron moves to the other anode catalytic layer 1-1, while, at the cathode catalytic layer 3-2, the electron supplied from the cathode current collector 3-1 and the proton and the oxygen supplied from the proton conductive layer 2 are reacted, thereby letting the electric current flow between the electrodes.

The current collectors 1-1 or 3-1 function as a conductive bus of the electron which contributes to the reaction of the catalytic layers 1-2 or 3-2 and are not necessarily required in the case where the electron of the catalytic layers 1-2 or 3-2 has high conductivity, and the electrode layer can be constituted only by the catalytic layers 1-2 or 3-2. Further, in order to supply a fuel or oxygen to the catalytic layers 1-2 or 3-2 by permeating the current collectors 1-1 or 3-1, the current collector is formed by a porous material having an opening sufficient enough to allow the fuel or oxygen to pass through.

Figure 2:
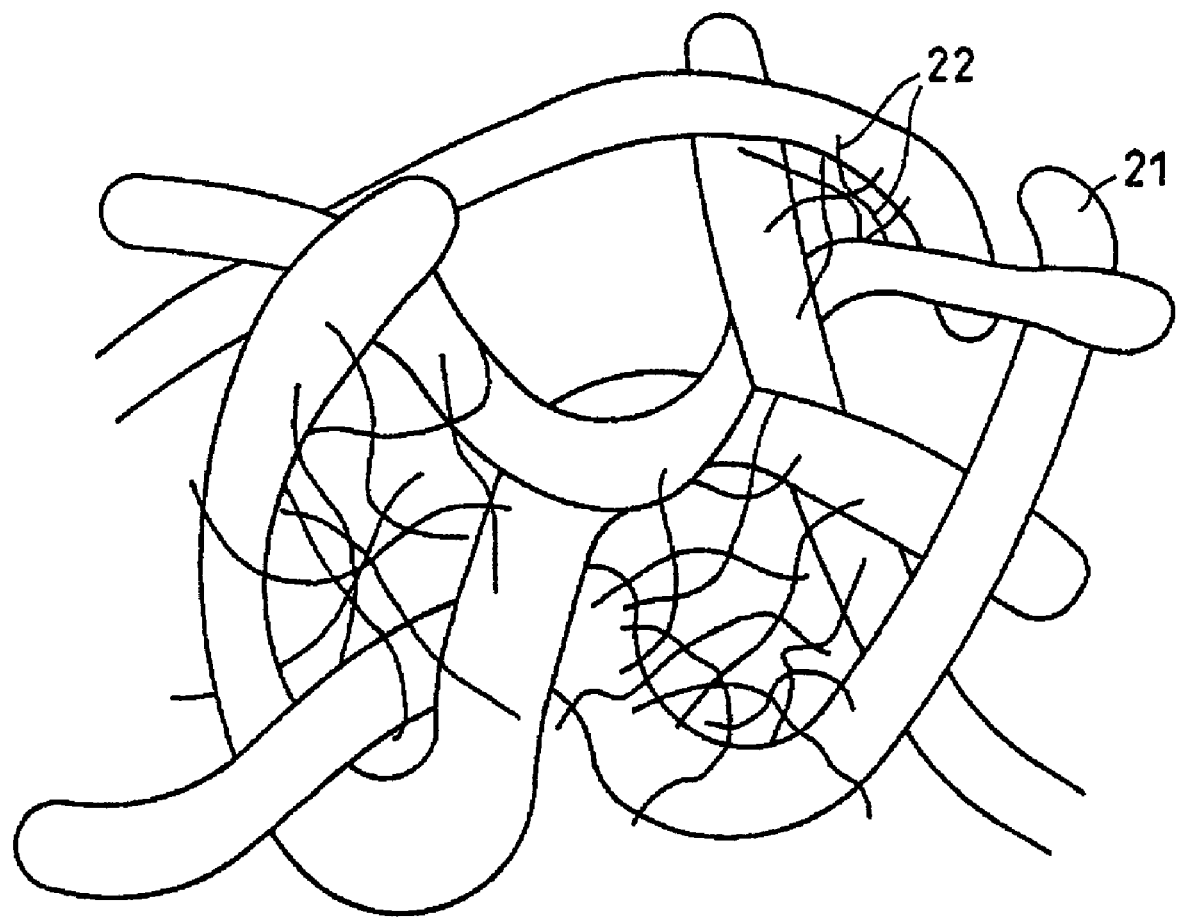
FIG. 2 is an enlarged view to show one example of a catlytic layer according to a first embodiment

FIG. 2 is an enlarged sectional view to conceptually show a skeleton of the catalytic layers 1-2 or 3-2, which describes a first embodiment of the present invention.

The catalytic layer has a conductive fiber having two particle diameter distribution peaks, one of which is a first particle diameter distribution peak existing at a small particle diameter side, and the other one of which is a second particle diameter distribution peak existing at a large particle diameter side. Hereinafter, the conductive fiber having the particle diameter belonging to the first particle diameter distribution peak is referred to as a carrier fiber, and the conductive fiber having the particle diameter belonging to the second particle diameter distribution peak is referred to as a skeleton fiber, thereby describing the first embodiment.

The catalytic layer has its skeleton formed by a conductive fiber 21 such as a carbon fiber and the like of a relatively large particle diameter having, for example, a minor axis of about 100 nm to 1 μm and a major axis of 1 μm to 1000 μm. This conductive fiber 21 is easy to maintain a skeleton as the catalytic layer because of its larger particle diameter, and can enhance electronic conductivity of the catalytic layer.

On the other hand, in a portion of the space of a skeleton formed by the skeleton fibers 21, there exist the carrier fibers 22 such as the carbon fibers of a relatively small particle diameter having, for example, a minor axis of about 5 nm to 100 nm as if they are mutually entangled as a mass (aggregate).

That is, a relative large space is formed in the skeleton formed from the skeleton fibers 21, and some places of the space are filled with the aggregate of the carrier fibers 22. For this reason, the aggregate of the carrier fibers is diffused and formed in the catalytic layer and formed by the skeleton fibers and, moreover, the catalytic layer having complex pores comprising large pores not filled with the carrier fibers and small pores formed in the aggregate of the carrier fibers 22 is formed.

As a result, diffusion of the fuel and the like in the catalytic layer is maintained by the space having no aggregate and, at the same time, the amount of catalyst in the catalytic layer can be secured by the carrier fibers.

Note that the proton conductive material is formed on the surface of the skeleton fibers 21 and the carrier fibers 22, and the proton conductivity is imparted to the catalytic layer and, at the same time, this proton conductive material functions as an adhering layer of each fiber of the fibers and is of use for shape maintenance of the catalytic layer.

Although the conductive fibers having a small particle diameter are referred to as the carrier fibers, this means only a capability of carrying the catalyst in higher density than the conductive fibers having a large particle diameter and does not deny to bear the catalyst on the skeleton fibers. Hence, it is preferable that the skeleton fibers are also allowed to bear the catalyst and the amount of catalyst is further increased.

The catalyst layer having the skeleton fibers and the carrier fibers as shown in FIG. 2 can be formed by the conductive fibers having not less than two particle diameter distributions, and usually can be obtained by laminating the conductive fibers having a small particle diameter (carrier fibers) on the conductive fibers (skeleton fibers 21) having a large particle diameter. However, the electrode or the fuel cell according to the present invention is not limited to those obtained by this manufacturing method.

The conductive fibers according to the present invention are, as described above, the conductive fibers having not less than two particle diameter distributions. For example, in the case of the fibers having an aspect ratio of 1:10 to 1000, it is preferable that the particle diameter value of a second particle diameter distribution peak is 5 to 500 times the particle diameter value of a first particle diameter distribution peak.

That is, when the particle diameter value of the second particle diameter distribution peak is smaller than 5 times, there is a risk of an aggregate of the carrier fibers, in which the skeleton fibers and the carrier fibers are uniformly mixed, being not formed. As a result, the pores to be formed inside the catalytic layer are uniformalized.

On the other hand, when difference in the peak particle diameter is larger than 500 times, the space in the skeleton to be formed by the skeleton fibers becomes too large and there is a risk of the carrier fibers being not held in the space of the skeleton fibers.

To be specific, by using the conductive fibers having a major axis of the particle diameter distribution peak of the skeleton fibers from about 1 μm to 10 μm and a minor axis of the particle diameter distribution peak of the carrier fibers from about 50 nm to 1 μm or having a minor axis of the particle diameter distribution peak of the skeleton fibers from about 100 mn to 1 μm and a minor axis of the particle diameter distribution peak of the carrier fibers from about 5 nm to 100 nm, the catalytic layer having an average pore size to be formed by the skeleton fibers inside the catalyst from about 100 nm to 10 μm and an average pore size to be formed by the carrier fibers from about 1 nm to 100 nm is formed, and it is preferably given a pore size distribution of about 1 nm to 10 μm as the catalytic layer. When the pore size inside the catalytic layer exceeds 10 μm, the content of the carrier fibers is lowered and, moreover, the amount of catalyst per unit volume inside the catalytic layer is lowered. When the pore size inside the catalytic layer becomes smaller than 1 nm, the fuel becomes difficult to diffuse into the aggregate of the carrier fibers, thereby reducing service efficiency.

As for the material to be used for the conductive fibers, though a carbon material, a metallic material, a semiconductor or a material coated with a conductive material on an insulating material can be used, when consideration is given to the shapes as described above, a carbon material, particularly so-called carbon nano-fibers can be cited as most suitable and, hereinafter, a manufacturing method thereof will be described.

The carbon nano-fibers can be obtained in such a manner that a metal such as nickel, iron, cobalt and the like and oxide of these metals or powders and alloy of the mixture thereof are taken as a catalyst for formation, and by bringing a raw material such as hydrocarbon and the like into contact with this catalyst for formation under heating atmosphere of about 500° C. to 1000° C., the source gas is decomposed so as to precipitate a fiber shaped carbon.

Note that when the carbon nano-fibers are formed under the environment to which an electric field is applied, the carbon nano-fibers orient to an electric field direction and grow into a relatively rectilinear shape. However, when the carbon nano-fibers are used for the present invention, it is preferable that orientation is not given to the carbon nano-fibers so that the space between the fibers can be easily formed. Therefore, it is preferable that the carbon nano-fibers is grown in a state of the electric field being not applied.

The minor axis of the carbon nano-fibers can be controlled, for example, by the particle diameter of catalytic powders for formation, and usually the particle diameter of the catalytic powders for formation is in the same level as the minor axis of the obtainable carbon nano-fibers.

Accordingly, it is desirable that, in case of manufacturing the skeleton fibers, the catalytic powders for formation having a particle diameter of about 100 nm to 1 µm are used and, in case of manufacturing the carrier fibers, the catalytic powders for formation having a particle diameter of about 5 to 100 µm are used.

On the other hand, the major axis of the carbon nano-fibers is different depending on a source gas density to be supplied, a formation temperature, a formation time and a catalyst for formation. For example, assuming that the source gas density is 15%, the formation temperature is 700° C. and the formation time is one hour, the carbon nano-fibers having a major axis of 5 nm to 1 µm are formed in the case of the catalyst for formation having a particle diameter of 5 nm, and the carbon nano-fiber having a major axis of 1 µm to 10 µm are formed in the case of the catalyst for formation having a particle diameter of 100 nm.

Further, due to heating at the formation time of the carbon nano-fibers, the catalyst for formation grows in particles and becomes coarse and there is a risk of a desired carbon nano-fibers being not obtained. In order to prevent the particle growth of the catalyst for formation, the raw material powders can be added with a non-reducible metallic oxide particles which are a particle growth inhibitor, for example, aluminum powders having a particle diameter of the same level as that of a growth catalyst.

The growth catalysts having different particle diameters are manufactured by using different reactors and, after that, both of the carbon nano-fibers may be mixed and deposited and used for the catalytic layers, or by using mixed powders of growth catalysts having different particle diameters, mixed powders (mixed fibers) of the carbon nano-fibers having different particle diameters are fabricated, and these powders may be deposited and used for the catalytic layer. This is because, as disclosed in the depositing method to be described later, usually when the catalytic layer is deposited, the conductive fibers (the skeleton fibers and the carrier fibers) are uniformly diffused into liquid for once so that the skeleton fibers are uniformly distributed and, as a result, the mixed state in a state of forming the carbon nano-fiber is different from the diffused state at the final forming time of the catalytic layer.

Further, as for the method of obtaining the mixed powders of the carbon nano-fibers having different particle diameters, there is a method of using secondary particles obtained by making a plurality of primary particles.

For example, when the secondary particles having a particle diameter of about 100 µm obtained by agglomerating the primary particles having a particle diameter of about 10 nm are used as the catalyst for formation, first, the carbon nano-fibers having a minor axis of about 100 µm which depend on the secondary particle diameter are formed and, after that, the secondary particles are decomposed so as to be the primary particles. Subsequently, the carbon nano-fibers having a minor axis of about 10 nm which depend on the primary particles are grown. When such secondary particles can be obtained as the catalyst for formation, the mixed powders of the carbon nano-fibers having not less than two particle diameter distributions can be easily manufactured.

Note that this catalyst for formation is not required for the electrode and, because there is a risk of the catalyst for formation being alloyed with an catalyst for the electrode and lowering the characteristic of the catalyst for the electrode, it is preferable that, after the carbon nano-fibers are formed, the carbon nano-fibers are dipped into, for example, the acid liquid and the catalyst for formation is dissolved and eliminated. Further, when the catalyst for formation is processed with the acid liquid, the component of acid liquid is adhered on the surface of the carbon nano-fibers and, because there is a risk of the carrying capacity of the catalyst for the electrode being lowered, it is preferable that the carbon nano-fibers are heated in hydrogen atmosphere as occasion demands and, by adhering hydrogen on the carbon nano-fibers, the carrying capacity of the catalyst for the electrode adhered on the carbon nano-fibers is improved.

On the other hand, it has been reported that, among the carbon nano-fibers obtained as described above, depending on the types of the catalyst for formation to be used, the source gas or heating conditions, there are available those having a surface c of a crystal surface of the carbon arranged in parallel to the fiber lengthwise direction of the fibers (so-called carbon nano tube) and those having a shape of the surface c being laid up in the fiber lengthwise direction (carbon nano-fiber of so-called helling born structure and platelet structure).

On the other hand, the present inventors have confirmed that a minute catalyst is formed at the side end of the surface c by the carrying method of the catalyst (the catalyst for the electrode) to be described later. That is, similarly to the conductive fibers, particularly the carbon nano-fibers of the herring bone structure as the carrier fibers or the carbon nano-fibers of the platelet structure, the surface c is laid up in the fiber lengthwise direction and, as a result, it was found that the carbon nano-fibers having high exposure at the side end of the surface c are most suitable. To be specific, by using the carbon nano-fibers of a structure having the surface c inclined to the fiber lengthwise direction at 30° to 90°, preferably at 45° to 90°, the catalyst (the catalyst for the electrode) carrying amount is enhanced.

Next, a method of carrying the catalyst (the catalyst for the electrode) according to the present invention on the conductive fibers such as the carbon nano-fibers will be described.

First, as for the catalyst for the electrode, a material that activates the reactions shown in the above described formula (1) or the formula (2) is used. For example, alloy particles of not less than one type of chemical elements and platinum selected from among platinum particles or elements of the platinum group (for example, Ru, Rh, Ir, Os or Pd) and the fourth period and the fifth period reduction metals and the like can be used.

To be more specific, as for the catalyst for the anode electrode, Pt—Ru can be cited, and as for the catalyst for the cathode electrode, Pt can be cited. However, it is not limited to these and in addition to which, Pt—Ru—Ir, Pt—Ru—Ir—Os, Pt—Ir, Pt—Mo, Pt—Fe, Pt—Co, Pt—Ni, Pt—W, Pt—Sn and the like can be cited.

Further, these catalysts become higher in the catalyst activity as the particle diameters thereof become smaller. For this reason, it is preferable that the particle diameter of the catalyst to be formed on the conductive fibers is taken as not more than 20 nm.

One example of the method of having the catalyst for the electrode carried on the surface of the conductive fibers will be described.

First, the conductive fiber is suspended in water and, after having been heated to about 40° C. to 100° C., is added with a precursor of the catalyst for the electrode.

As for the precursor of the catalyst for the electrode, salt of the catalyst for the electrode may be used. For example, when platinum particles are used as the catalyst, for example, chloroplatinic acid (H2PtC16) may be used.

By resolving such a precursor in suspension, the suspension is taken as an acid solution.

Alkali is added in the acidified suspension and is neutralized by continuing to heat adequately and, for example, hydroxide of the material which constitutes the catalyst for the electrode such as, for example, Pt (OH) 4 and the like is formed, and this hydroxide is allowed to bear on the conductive particle surface. Further, this suspension is filtered and dried, thereby obtaining a catalyst carrier on which Pt—(OH)4 and the like are carried. This catalyst particle is repeatedly rinsed and filtered as occasion demands, and elimination of impurity ion to be formed by neutralizing reactions may be further performed.

The conductive fibers on which hydroxide such as Pt (OH) 4 and the like is carried are put under reduction atmosphere, and hydroxide such as Pt (OH) 4 and the like is reduced so as to form the catalyst for the electrode such as platinum, so that the catalyst particle for the electrode is carried on the conductive fiber surface.

As for the reduction atmosphere, it may be within the temperature range of 100° C. to 900° C., preferably 200° C. to 500° C. in the gas atmosphere including reduction gas such as hydrogen. When the reduction temperature is lower than 100° C., crystallization of platinum system metallic particles becomes insufficient and, when it is used for the electrode, increase in the particle diameter tends to occur. When the reduction temperature is not less than 900° C., increase in the particle diameter of platinum light metallic particles occurs and the catalyst activity per unit weight is lowered due to reduction in specific surface area.

It is desirable that the carrying amount of the catalyst for the electrode for the conductive fibers is taken as 5 wt % to 80 wt %. When the amount is smaller than 5 wt %, cell performance does not come out and, when the amount is larger than 80 wt %, the catalyst cannot be satisfactorily carried on the catalyst carrier.

Next, a method of forming a film comprising a proton conductive material on the conductive fiber surface and, at the same time, forming the catalytic layer will be described.

First, as for the proton conductive material, anything will do if it can transmit proton. Although practical examples are cited below, it is not limited to this. For example, inorganics such as fluorine system resin, tungstic acid, phosphotungstic acid can be cited.

The proton conductive material has one weight portion to 400 weight portions for 100 weight portions of the conductive fibers and it is particularly good when it has 10 weight portions to 200 weight portions. When it has only one weight portion, the proton conductive matter becomes insufficient, and resistance rises and cell performance lowers. When it has not less than 400 weight portions, not only the electronic resistance rises, but also the diffusion of the fuel is lowered because pores are filled with the proton conductive matter, and the cell performance is lowered.

By the above described ratio, the conductive fibers (the skeleton fibers and the carrier fibers) and the proton conductive material are thrown into organic solution or its mixed liquid and uniformly dispersed and resolved in water by a distributor so that slurry is prepared.

For example, the current collector (carbon paper, carbon cloth and the like) is taken as a support, and the slurry obtained after the surface of this support was subjected to water repellent processing is coated and, by drying the coated slurry, a layer formed by the proton conductive material can be given on the surface of the conductive fibers which bear the catalyst.

On the other hand, when the slurry is dried, a skeleton of the catalytic layer is formed by the skeleton fibers, and the carrier fibers are entangled, for example, in a small space inside the skeleton. In the portion where the carrier fibers are entangled, the space is further diminished in size and other carrier fibers are more easily entangled. As a result, from among the spaces formed by the skeleton fibers, the space once entangled with the carrier fibers becomes selectively high in the carrier fiber density, and a distribution is formed in the carrier fiber density in the catalytic layer, which is obtained finally.

It is preferable that each slurry component is prepared in such a manner that the amount of the solid component in the slurry becomes 5 wt % to 60 wt %. When the amount of the solid component is smaller than 5 wt %, a film cannot be deposited on the current collector and there is a risk of the film passing through the opening of the current collector. When the amount exceeds 60 wt %, there is a risk of the obtainable catalytic layer peeling off from the current collector.

Further, there is also available a method, wherein, after the conductive fibers are deposited, the proton conductive material is imparted thereon.

First, a fluid dispersion, in which the conductive fibers are uniformly dispersed in water or organic solvent, is coated, for example, on the support surface of the current collector (carbon paper, carbon cloth and the like). The fluid dispersion is filtered by the current collector and a layer of the conductive fibers is formed on the current collector. After the layer thickness is uniformalized by a technique such as a papermaking as occasion demands, the layer of the conductive fibers is dried.

From among the spaces formed by the skeleton fibers, the space once entangled with the carrier fibers becomes selectively high in the carrier fiber density.

After having formed a film by the conductive fiber in this way, this film is impregnated in the dissolved fluid or suspension and dried, so that the film of the proton conductive material is formed on the conductive fiber surface.

Further, in the case where the skeleton fibers and the carrier fibers are mixed, they are not dispersed after having been mixed, but each type of the fibers is dispersed, sucked and filtered respectively or a papermaking thereof may be performed.

Note that the above described reduction treatment of the catalyst for the electrode to be carried on the conductive fiber surface is performed at the time of drying treatment to form the catalytic layer, so that the manufacturing step of the electrode can be simplified.

The thickness of the catalytic layer fabricated in this way, though being different depending on the characteristics of the cells, may be usually formed about 10 μm to 500 μm.

Next, a second embodiment according to the present invention will be described.

For example, the fuel cell having methanol and water as the fuel is supplied with a liquid fuel for the anode electrode. On the other hand, the anode electrode uses an anode electrode made of a porous material so as to effectively use the catalyst inside the electrode.

When the liquid fuel reaches the proton conductive film by passing through the pores inside the anode electrode, the liquid fuel travels through the proton conductive film till it reaches the cathode electrode. As a result, the fuel and oxygen to be supplied to the cathode electrode directly react so that there is a risk of the electrode being unable to function as a cell.

The present embodiment aims to solve such a problem, and s sectional view of the electrode according to the present embodiment will be shown and described below.

Figure 3:
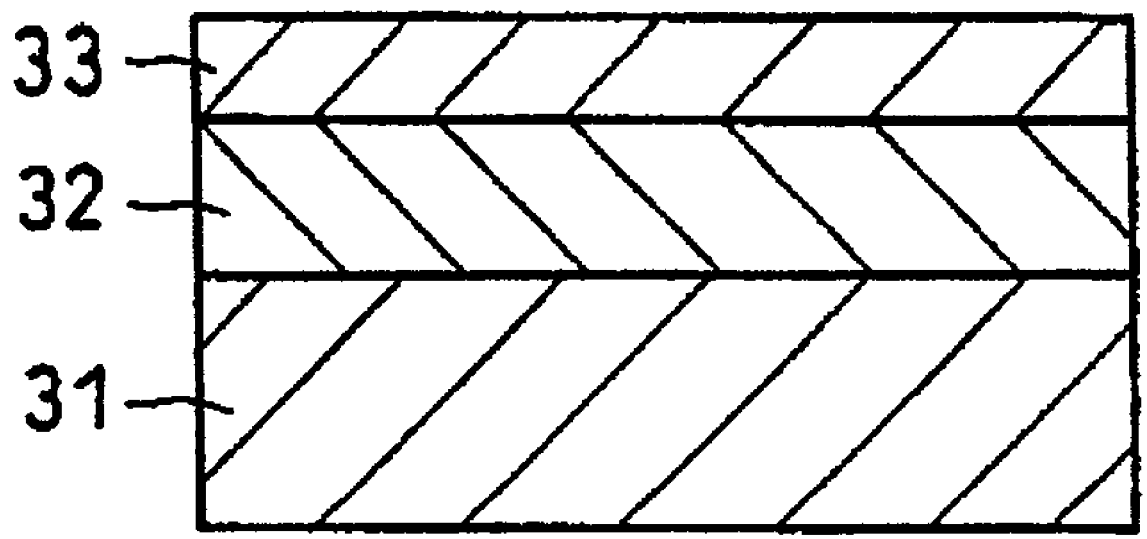
FIG. 3 is a sectional view to show one example of an electrode according to a second embodiment.

The electrode shown in FIG. 3 has laminated catalytic layers formed by laminating in order a catalytic layer 32 (hereinafter, referred to as a rough catalytic layer) having a large pore size or high porosity on the surface of a current collector 31 and a dense catalytic layer 33 (hereinafter, referred to as a dense catalytic layer) having a small pore size or low porosity in contrast to the rough catalytic layer 32.

This electrode is used as an anode electrode shown in FIG. 1, and the dense catalytic layer 33 is arranged so as to be adjacent to a proton conductive film.

The liquid fuel supplied to the current collector 31 formed by a porous material passes through an opening of the current collector 31 and penetrates into the pores inside the rough catalytic layer 32. However, because the fuel is not easily able to pass through the dense catalytic layer 33 having a low porosity, there is a risk of no fuel reaching the proton conductive film.

The rough catalytic layer 32 uses the skeleton fibers, which allow the catalyst for the electrode described in the first embodiment to bear on them, as the conductive fibers, and may be constituted in such a manner that, similarly to the first embodiment, the proton conductive material is formed as a film on the conductive fibers which form a skeleton or may be constituted quite similarly to the first embodiment where the currier fibers are dispersed in the skeleton fibers with distributions and, moreover, the proton conductive material is formed as films on the surfaces of the skeleton fibers and the carrier fibers.

From among the rough catalytic layers obtained, those having about 50% to 90% of porosity and about 100 to 1 μm of average pore size with a wide distribution of the pore size within this range are preferable. When the porosity is not more than 50% and the average pore size not more than 100 μm, the fuel is difficult to diffuse inside the catalytic layer 32, and when the porosity is not less than 90% and the average pore size not less than 1 μm, the catalytic density inside the rough catalytic layer 32 is lowered.

The dense catalytic layer 33 can use, for example, the carrier fibers described in the first embodiment, but it is preferable that normal conductive particles having little or no flatness are used because, in general, powders made of fibers have high porosity and tend to have large pore size.

To be specific, the dense catalytic layer 33 is preferably formed by the conductive particles having an average particle diameter of about 10 nm to 100 nm and an aspect ration of 1:1 to 5, and the porosity of the dense catalytic layer obtained is preferably taken as not more than 30% and the average pore size as about 10 nm to 50 nm. It is difficult to obtain the conductive catalytic carrier having a particle diameter of 10 nm and, when the particle diameter exceeds 100 nm, there is a risk of the porosity exceeding 30% or the pore size exceeding 50 nm with a result that there is a risk of the liquid fuel passing through the catalytic layer 33.

As for the material of the conductive particles, anything can be used without any specific limit if it has electronic conductivity. For example, carbon material other than carbon black such as black carbon can be used.

It is desirable that the pores existing in the dense catalytic layer 33 have an average fine pore size of not more than 1 μm and porosity of not more than 50% and, moreover, both of them have still smaller values. When the average fine pore size or the porosity are larger than the above described values, there is a risk of the liquid fuel passing through the inside of the fine pores of the dense catalytic layer 33.

Further, the catalyst for the electrode in the dense catalytic layer 33 is low in supply property of the fuel except for the catalyst existing in an interface with the rough catalytic layer 33 and cannot sufficiently exert a function as the catalyst and it is, therefore, preferable to have a film thickness of not more than ⅕ in relation to the rough catalytic layer 32. That is, when the film thickness of the dense catalytic layer 33 is larger than ⅕ of the film thickness of the rough catalytic layer 32, service efficiency of the catalyst is lowered and a cell power generation amount per electrode volume is lowered. Practical film thickness value is preferable to be not more than 100 μm.

Further, the film thickness of the dense catalytic layer is preferably to be not less than 1 μm. When the film thickness is smaller than 1 μm, there is a risk of the liquid fuel passing through the dense catalytic layer.

The manufacturing method of the conductive fibers, the carrying method of the catalyst on the conductive fibers, the forming method of the rough catalytic layer and the like may be performed in the same way as the method of forming the catalytic layer in the first embodiment.

The carrying method of the catalyst on the conductive particles conforms to the first embodiment and, except for using the conductive particles in replacement of the conductive fibers used in the first embodiment, may be treated similarly to the first embodiment.

It is difficult to directly form the dense catalytic layer on the rough catalytic layer surface. Therefore, the dense catalytic layer is deposited on the surface of a transfer substrate having a smooth face which is precipitately prepared in advance and, after that, the deposited dense catalytic layer may be transferred from the transfer substrate to the rough catalytic layer. Note that the method of forming the dense catalytic layer on the transfer substrate surface conforms to the first embodiment and, except for using the conductive particles in replacement of the conductive fibers used in the first embodiment, may be treated similarly to the first embodiment.

A fabricating method of the fuel cell using the electrode shown in the first or the second embodiment will be described.

The cathode electrode and the anode electrode shown in the first embodiment, or a pair of electrodes comprising the anode electrode shown in the second embodiment and any cathode electrode and the proton conductive film formed by the proton conductive material such as fluorine system polymer material having carboxylate are prepared. For example, when Nafion 117 (product name: made by Du Pont), which is fluorine system polymer material having carboxylate, is used as the proton conductive film, its film thickness may be about 50 μm to 200 μm.

A laminated member which holds this proton conductive film by a pair of electrodes is thermo-compression-bonded by a roll or a press so that the fuel cell (membrane electrode complex: MEA) can be fabricated. The conditions of the thermo-compression-boding at this time may be that the temperature is not less than 70° C. and not more than 180° C., the pressure is taken as 10 kg/cm2 to 200 kg/2 and a contact bonding time is about 1 to 30 minutes. When the pressure, the temperature or the time is lower or shorter than these values, there is a risk of a cell performance becoming poor because the contact bonding is not sufficient and resistance as an electrode portion is high. On the other hand, when the conditions are such that the pressure is higher, the temperature is higher and the time is longer than the above described values, deformation and decomposition of the proton conductive film as well as deformation of the current collector become large and, therefore, there is a risk of the fuel and the oxidizer being not satisfactorily supplied to the inside of each electrode and the characteristic of the proton conductive film being lowered.

Next, a third embodiment according to the present invention will be described.

The fuel cell in the present embodiment can be also constituted as shown in FIG. 1.

In the present embodiment, the current collectors 1-1, 3-1 of FIG. 1 comprise porous body formed by the conductive material and have a function to effectively transmit the electron formed by the anode catalytic layer 1-2 to the outside or a function to effectively transmit the electron supplied from the outside to the cathode catalytic layer 3-2. Furthermore, the current collectors 1-1, 3-1 have a function to supply the fuel or the oxidizer gas supplied to the current collectors to the catalyst layer for the electrodes 1-2, 3-2.

As for the material to be used for the current collectors 1-1, 3-1, anything can be used without any specific limit if it has electronic conductive power. For example, in addition to a carbon material such as carbon and the like, metallic oxide such as metallic oxide having conductivity such as metal, stannic oxide, titanic oxide and the like can be cited. However, because the material having proton conductivity is generally a strong acid material, particularly when a metallic material is used for the current collector, it is desirable that the material having high acid-resistance is selected.

As for the porous body, it is preferable that the porous body having conductive fibers processed in the shape of a sheet similar to the carbon cloth and the carbon paper which are, for example, formed by carbon fibers and the like is used, and for example, the carbon paper having a porosity of not less than 50% fabricated by the carbon fibers having, for example, a fiber size of not less than about 1 μm may be used. Further, it is possible to use a sintered member as the porous body, and the metallic material or sintered metallic oxide may be used.

Figure 5:
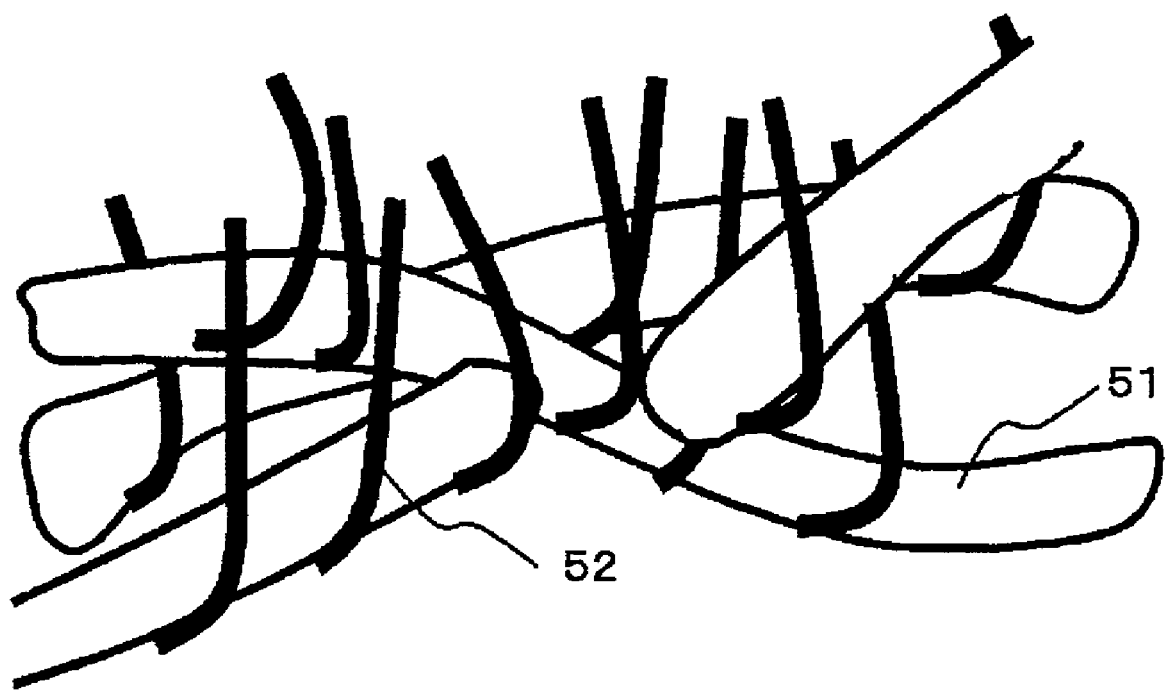
FIG 5 is an enlarged view to show one example of the catalytic layer according to a third embodiment.

In FIG. 5 is shown an enlarged view of the electrode, and the catalytic layer will be described with reference to FIG. 5.

A conductive fiber 51 is a conductive material which constitutes a part of the current collector and has a fiber size of about not less than 5 μm as described above, and growing from the under surface (the side to which the fuel or oxidizer gas is supplied when used for the fuel cell) of the conductive fiber 51 shown in the drawing to go around the conductive fiber 51 toward the upper side of the conductive fiber 51, a carbon nano-fiber 52 is formed. The surface of the carbon nano-fiber 52 is carried with the catalytic particle for the electrode and, moreover, is adhered with the proton conductor, which contacts the catalytic particle for the electrode. Although the proton conductor is formed up to the surface of the conductive fiber, the proton conductive layer and the catalyst for the electrode are not shown.

The catalytic layer is formed by the catalytic particle for the electrode, the carbon nano-fiber which functions as an electronic conductive bus between the catalytic particle for the electrode and the conductive fiber and the proton conductor which functions as the proton conductive bus between the catalytic particle for the electrode and an electrode exterior (electrolyte film when used for the fuel cell), and for example, in FIG. 5, though the catalytic layer is formed inside the current collector (between the conductive fibers 51) and on the surface of the current collector, on the surface of the current collector alone, the catalytic layer maybe formed. Further, when the proton conductive layer has a constitution to contact the electrolyte film, the carbon nano-fiber may be of a catalytic layer constitution in which it exists only inside the current collector.

Further, because the carbon nano-fiber shown in FIG. 5 grows from the under surface of the current collector toward the upper surface side direction along the conductive fiber, adhesive properties with the conductive fiber are high and, furthermore, has such a constitution that electronic conductivity at the interface with the carbon nano-fiber and the conductive fiber is good.

It is desirable that not less than 50% of the carbon nano-fibers in the catalytic layer have the top end portion (end portion different from the end portion which contacts the current collector) placed at an angle of not less than 45° to the current collector surface. When the carbon nano-fibers placed at an angle of not less than 45° to the current collector surface exists by exceeding not less than 50%, there is a risk of the film thickness of the catalytic layer being not secured. Or when the angle of the catalytic layer is smaller than 45°, electron transmission efficiency is lowered because the electron conductive bus from the top end portion of the carbon nano-fiber becomes longer for the film thickness of the catalytic layer.

Note that what is meant by the surface of the current collector is not the surface seen at microns of a fiber level which constitutes the current collector, but the surface seen at macros when seen from the entire current collector and denotes the surface having, for example, an area of about 3 mm×3 mm of the current collector surface. Further, what is meant by the top end portion of the carbon nano-fiber is a portion of about 10 nm from the top end of the carbon nano-fiber, and the inclination of this portion may be measured.

The carbon nano-fiber is a fiber state having a graphite structure, and there are those fibers available such as having a so-called platelet structure where a graphite c surface, of which c axis is parallel to a fiber lengthwise direction, is laid one upon another in the fiber lengthwise direction, or having a so-called herring bone structure where the c surface, of which c axis is inclined toward in the fiber lengthwise direction, is laid one upon another, or a so-called carbon nano-tube where a carbon surface, of which c surface is parallel to the fiber lengthwise direction, is made cylindrical. From among these fibers, it is desirable that the carbon nano-fiber having the platelet structure or the herring bone structure is used.

This is because the carbon atom constituting carbon has a strong cohesion in the c surface direction, and the carbon nano-fiber having the platelet structure or the herring bone structure has the c surface portion exposed to the fiber side surface and, therefore, a large amount of catalysts for the electrodes can be carried on the side surface of the fiber.

As for the shape of the carbon nano-fibers, it is desirable that those having a fiber length of about 1 μm to 100 μm and a fiber size of 5 nm to 500 nm are used. When the fiber length is shorter than 1 μm, the catalyst for the electrode which can adhere on the carbon nano-fiber is diminished in the amount, and electromotive force of the fuel cell is diminished. Besides, the distance between the carbon nano-tube and the electrolyte film becomes larger and there is a risk of the proton conductive bus between the catalyst carried on the carbon nano-tube and the electrolyte film becoming longer. The carbon nano-tube which exceeds 50 μm in the fiber length is difficult to be formed in high density on the current collector surface and a ratio of the catalyst particle in the electrode is lowered. Further, when the fiber size is shorter than 1 μm, it is difficult to fabricate the carbon nano-fiber having the fiber length of not less than 1 μm. When the fiber size becomes larger than 50 nm, the specific surface area of the carbon nano-fiber becomes smaller, and the ratio of the catalyst for the electrode to be carried on the carbon nano-tube surface is lowered.

Furthermore, it is desirable that the carbon nano-fiber contains hydrogen atom of not less than 0.3 wt %. By containing hydrogen atom of not less than 0.3%, it is possible to raise a carrying rate of the catalyst for the electrode.

It is preferable that the ratio of the carbon nano-fiber in the catalytic layer is within the range of 30 vol % to 80 vol %. When the ratio of the carbon nano-fiber is smaller than 50 v01%, the ratio of the catalyst particle for the electrode in the catalytic layer is lowered, and when the ratio is larger than 80 vol %, a porosity in the catalytic layer is lowered and diffusion of the fuel or the oxidizer gas into the catalytic layer becomes poor, thereby lowering service efficiency of the catalytic particle for the electrode.

For the catalyst for the electrode, the material which activates the reactions shown in the above described formula (1) or the formula (2) is used. For example, platinum particle or elements of platinum group (for example, Ru, Rh, Ir, Os or Pd) and alloy particle with more than one type of elements selected from among the fourth cycle and the fifth cycle transition metals and platinum and the like can be used.

To be more specific, for the catalytic particle for the anode electrode, Pt can be cited, and for the catalytic particle for the cathode electrode, Pt—Ru alloy can be cited. However, these particles are not limited to this.

Further, these catalytic particles for the electrode become higher in the catalytic activity as the particle diameter becomes smaller. For this reason, it is preferable that the particle diameter of the catalytic particle for the electrode is taken as not more than 5 m and that the average number density of the catalytic particle for the electrode for the carbon nano-tube surface is not more than $1 \times 10^{16}$ pcs/m2. Furthermore, it is desirable that the specific surface area of the carbon nano-fiber according to the BET method is not less than 100 m². By taking the specific surface area of the carbon nano-fiber as 100 m², adherence efficiency of the catalyst for the electrode on the carbon nano-fiber is enhanced.

The proton conductor may be formed by the proton conductive material, and for example, fluorine system resin having sulfonic group and the like are used.

Usually, the proton conductive layer is formed so as to cover the whole surface of the carbon nano-fiber and functions as the proton conductive bus between the catalyst for the electrode carried on the carbon nano-fiber and the catalytic layer exterior (electrolyte film).

The fabrication method of such an electrode for the fuel cell will be described below.

(1) Deposition of the Catalyst for Formation

The current collector such as described above is prepared and, first, the catalyst for formation is adhered on one side of the current collector to form the carbon nano-fiber.

As for the catalyst for formation, for example, the metallic material such as Ni, Fe, Co and the like or the alloy with these metals and Cu, Ag, Mn may be used. Regarding these metallic components, for example, they are described in detail in the literature (J. Mater, Res. vol.8, No. 12(1993) 3233-).

Particularly when Ni is used for the catalyst for formation, it is easy to form the carbon nano-fiber having the platelet structure, and when Ni—Cu alloy is used, it is easy to form the carbon nano-fiber having the herring bone structure.

The carrying method of the catalyst for formation is not particularly limited to a physical or chemical deposition method and, for example, a magnetron sputtering method or a deposition method by electric resistance heating can be cited.

It is preferable that the catalyst for formation is adhered on the current collector surface with a layer thickness of about 50 nm to 200 nm. When the layer thickness is smaller than 50 nm, the density of the carbon nano-fiber to be formed is lowered.

When the catalyst for formation is alloyed with the catalyst particle for the electrode, the function of the desired catalyst for the electrode is not obtained. For this reason, in order to prevent alloying with the catalytic particle for the electrode, the layer thickness of the catalyst for formation is taken as not more than usual 200 nm. Note that, when the component element constituting the catalytic particle for the electrode and the catalytic element for formation are the same element, the amount of the catalyst for formation may be controlled so that it is used for the catalytic particle for the electrode.

(2) Formation of Carbon Nano-fiber

Next, the carbon nano-fiber is grown from the catalyst for formation, for example, by the thermal CVD method. To be specific, first, the current collector is arranged on a substrate having no air permeability so that the surface which formed the catalyst for formation turns into the under surface. This collector is introduced into a furnace heated to about 500° C. to 1000° C. The carbon-containing gas is used as a source gas, and this source gas is introduced into the furnace and the source gas is distributed on the upper surface side of the current collector.

As for the source gas, for example, a gas such as ethylene, methane, acetylene and the like can be cited. Furthermore, it is preferable that a mixed gas mixing these gases and inactive gases such as hydrogen, helium, argon, nitrogen and the like is used, and for example, a mixed gas having a ratio of ethylene:hydrogen=1:5 may be used.

This source gas is brought into contact with the heated catalyst for formation and decomposed, and a nano-fiber is formed in such a manner that a carbon is precipitated between the catalyst for formation and the current collector so as to lift up the catalyst for formation.

It is desirable that a rate of flow of the source gas is about 10 ml/g to 101/g per minute for the catalyst for formation. When the rate of flow is smaller than 10 ml/g, the amount of decomposition of the source gas by the catalyst for formation becomes higher and it becomes difficult to maintain the source gas density constant at the reaction time. Even when the rate of flow is higher than 101/g, formation speed of the carbon nano-fiber is not increased. Further, there is a risk of stable maintenance of the current collector becoming difficult due to source gas flow.

As for stoving temperature at this time, it is preferable that it is taken as about 500° C. to 1000° C. When the stoving temperature is lower than 500° C., there is a risk of the source gas being not decomposed and a carbon being not precipitated. When the temperature is higher than 1000° C., the amount of the carbon to be precipitated becomes too much and there is a risk of the carbon not becoming a fiber state. Particularly in the case where the catalyst for formation is Ni or Ni—Cu, the carbon nano-fiber having the platelet structure or the herring bone structure tends to be formed by setting the stoving temperature at 600° C. to 1000° C.

When the surface where the catalyst for formation was formed is turned into the under surface and the source gas is let flow on the upper surface of the current collector, the source gas which is inside the current collector or in the space between the current collector and the substrate is consumed, while the carbon nano-fiber begins to be formed and it grows as shown in FIG. 1 along the conductive fiber constituting the current collector toward the current collector upper surface side having high density of the source gas.

The fiber length of the carbon nano-fiber differs depending on the formation time, and for example, by continuing to heat for about 0.5 h to 5 h under the above described conditions, the fiber length can be grown up to about 1 μm to 100 μm.

Further, as described above, when the catalyst for formation remains in the carbon nano-fiber, there is a risk of its being alloyed with the catalyst for the electrode and, therefore, after the carbon nano-fiber is formed, the catalyst for formation may be eliminated.

For example, the carbon nano-fiber is dipped into acid solution and the catalyst for formation is dissolved and, after that, the carbon nano-fiber is rinsed so that the catalyst for formation can be eliminated from the carbon nano-fiber surface.

(3) Carrying of the Catalyst for the Electrode

On the carbon nano-fiber obtained as described above, the catalyst particle for the electrode is carried, for example, as follows.

For example, the case where Pt fine particle is carried as the catalyst particle for the electrode will be described.

First, the carbon nano-fiber is suspended in water with the current collector and, after being heated to about 40° C. to 100° C., a precursor of the catalyst particle for the electrode is added.

As for the precursor of the catalytic particle for the electrode, salt of the catalyst for the electrode may be used, and for example, when alloy particle is to be obtained as the catalyst particle, chroloplatimnic acid (H2PtC16) may be used.

By dissolving such a precursor in suspension, suspension is taken as an acid solution.

Alkali is added in the acidified solution, and the acidified solution is neutralized by continuously being heated and, for example, hydroxide of the material constituting the catalyst for the electrode such as Pt (OH) 4 is formed, and this hydroxide is precipitated on the conductive particle surface. Further, this suspension is filtered and dried so as to obtain the catalytic carrier on which Pt (OH) 4 and the like are carried. This catalytic particle is repeatedly rinsed and filtered as occasion demands, and elimination of impurity ion formed by neutralized reaction may be performed.

The conductive fiber on which hydroxide such as Pt (OH) 4 and the like are carried is put under reduction atmosphere, and hydroxide such as Pt (OH) 4 and the like are reduced to form the catalyst for the electrode of platinum, thereby carrying the catalyst particle for the electrode on the conduction fiber surface.

As for the reduction atmosphere, it may be within the temperature range of 100° C. to 900° C., preferably 200° C. to 500° C. in the gas atmosphere including reduction gas such as hydrogen. When the reduction temperature is lower than 100° C., crystallization of platinum system metallic particle becomes insufficient and, when it is used for the electrode, increase in the particle diameter tends to occur. When the reduction temperature is not less than 900° C., increase in the particle diameter of platinum light metallic particle occurs and the catalyst activity is lowered.

It is desirable that the carrying amount of the catalyst for the electrode for the conductive fiber is taken as 10 wt % to 80 wt %. When the amount is smaller than 20 wt %, the cell performance does not come out and, when the amount is larger than 80 wt %, the catalyst cannot be satisfactorily carried on the catalyst carrier.

(4) Imparting of Proton Conductor

For example, when the proton conductive material constituting the proton conductor is fluorine system resin having sulfonic group, the solution which dissolved this material into organic solvent is prepared, and this solvent is impregnated in the current collector on which the carbon nano-fiber was formed.

After that, the impregnated solvent is dried, so that the proton conductor is adhered on the carbon nano-fiber surface (and the current collector surface).

By using the solvent which dissolved, for example, about 5% to 20% of the proton conductive material having high density, impregnation and drying are performed once at a time, respectively, so that the proton conductive material may be adhered on the carbon nano-fiber surface, or by using the solvent which dissolved, for embodiment 1% to 5% of the proton conductive material having a low density, impregnation and drying are repeatedly performed, so that the proton material may be adhered on the carbon nano-fiber surface.

The electrode for the fuel cell formed in this way can be used for the material using polymer as the proton conductive material, and can be used also for the fuel cell of the type where the fuel to be supplied to the anode electrode is not the liquid fuel such as methanol, but hydrogen fuel.

Particularly, the electrode for the fuel cell according to the present invention has high air-permeability because the carbon nano-fiber is oriented to the film thickness direction of the catalytic layer. For this reason, when the carbon nano-fiber to be supplied to the electrode is used for the type of the electrode to be used for the gas such as hydrogen gas and oxidizer gas, these gases are easy to diffuse into the catalytic layer, thereby improving service efficiency of the catalyst for the electrode. On the other hand, when the carbon nano-fiber is used for the anode of the fuel cell which uses the liquid fuel, the liquid fuel passes through the anode electrode and the electrolyte film so as to directly react with the oxidizer, and there is a risk of the power generation efficiency of the fuel cell being lowered.

Next, the fabricating method of the fuel cell will be described.

One pair of electrodes of the conventionally known anode electrode and the cathode electrode obtained as described above and the electrolyte film are prepared.

As for the electrolyte film, the film using the same material as the above described proton conductor can be utilized, and the film thickness at this time may be about 20 μm to 200 μm.

This proton conductor is held by one pair of electrodes and is thermo-compression-bonded by a roll or a press, so that the fuel cell (film electrode complex: MEA) can be fabricated.

The conditions of the thermo-compression-boding at this time may be that the temperature is not less than 70° C. and not more than 180° C., the pressure is taken as 10 kg/cm2 to 200 kg/2cm2 and a contact bonding time is about 1 to 30 minutes. When the pressure, the temperature or the time is lower or shorter than these values, there is a risk of cell performance becoming poor because the contact bonding is not sufficient and resistance as an electrode portion is high. On the other hand, when the conditions are such that the pressure is higher, the temperature is higher and the time is longer than the above described values, deformation and decomposition of the electrolyte film as well as deformation of the current collector become large and, therefore, there is a risk of the fuel and the oxidizer being not satisfactorily supplied to the inside of each electrode and the characteristic of the proton conductive film being lowered.

EXAMPLES

Although embodiments according to the present invention will be described below, it is to be understood that the present invention is not limited to this.

(Embodiment 1)

Fabrication of Conductive Fiber

A mixed powder comprising platinum oxide powder and copper oxide powder as the catalytic raw material for the carbon nano-fiber and aluminum oxide powder comprising a primary particle of an average particle diameter of 30 nm to control the particle growth of the catalyst for formation were prepared.

Note that a ratio of platinum oxide powder and copper oxide powder was taken as a ratio of platinum element and copper element which is 1:1, and a ratio of aluminum oxide to platinum oxide powder and copper oxide powder was taken as 4 vol %.

This mixed powder was mixed and pulverized with a aluminum ball by using a planetary ball mill in a container for two days, thereby uniformly dispersing various particles.

The uniformly dispersed mixed powder is put into a boat made of crystal and introduced into a tubular furnace, and the inside of the tubular furnace is replaced with a mixed gas 1:1 of hydrogen and argon of 1 L per minute, and a furnace temperatures was raised up to 200° C. and maintained for 10 minutes. After that, a mixed ratio of the gas was gradually changed until it turned into 100% of a hydrogen gas of 1 L per minute, and the temperature inside the furnace was raised up to 500° C., and nickel oxide and copper oxide were all reduced and maintained at 500° C. for 30 minutes to be alloyed sufficiently, thereby fabricating the catalytic particle for formation comprising Cu—Ni alloy.

Subsequently, the carbon nano-fiber (conductive fiber) was formed from the catalyst for formation as below. The temperature inside the furnace housing the catalytic particle for formation was raised from 500° C to 700° C and, after that, ethylene gas as a source gas was introduced into the furnace, where the hydrogen gas has been introduced, at a flow rate of 200 ml/min, and a carbon was precipitated out with Cu-Ni alloy particle as a catalyst, thereby forming the carbon nano-fiber which is the conductive fiber.

After the furnace was cooled, the carbon nano-fiber was taken out, and when its weight was measured, its weight was about ten times the source powder.

When the obtained carbon nano-fiber was observed by an electron microscope, it was confirmed that a carbon nano-fiber with a c surface placed at an angle of 45° to the lengthwise direction of the fiber laminated in the lengthwise direction of the fiber having the so-called herring bone structure was obtained.

Further, the obtained carbon nano-fiber was fabricated in two types different in the particle diameter, one of which has a shape having a minor axis distribution peak at the minor axis of 500 nm and, moreover, having a major axis distribution peak at the major axis of 50 μm (minor axis of 400 nm to 600 nm, major axis of 20 μm to 70 μm), and the other of which has a shape having a minor axis distribution peak at the minor axis of 50 nm and, moreover, having a major axis distribution peak at the major axis of 5 μm (minor axis of 40 nm to 60 nm, major axis of 1 μm to 10 μm).

Further, there existed aluminum oxide fine powder in the carbon nano-fiber.

Note that, as a confirmation test, the processing up to formation of the catalytic particle for formation was performed totally identical and, when the obtained Cu—Ni alloy was checked, it was found to be the Cu—Ni alloy comprising the secondary particle having an average particle diameter of 500 nm which was made of the primary particle having an average particle diameter of 50 nm, and from this fact, it is clear that the carbon nano-fiber having a minor axis corresponding to the secondary particle diameter and the carbon nano-fiber having the minor axis corresponding to the primary particle diameter were formed.

In this way, the conductive fiber having two types of the particle diameter distributions was obtained.

Carrying of the Catalyst for the electrode on the Conductive Fiber

The carbon nano-fiber which is the conductive fiber and different in the particle diameter was dispersed in water and a fluid dispersion was obtained. The fluid dispersion was heated and boiled and added with chroloplatinic acid which is a catalytic material for the electrode. Chroloplatinic acid was converted and added so that an alloy component becomes 15 wt % for the total amount of the conductive fiber.

After 20 minutes from when chroloplatinic acid was 2added, sodium hydrogen carbonate solvent fluid dispersion was dripped so as to become pH10 by spending one hour, and chroloplatinic acid and sodium hydrogen carbonate were reacted to form a hydroxide of platinum, which was carried on the conductive fiber surface. Note that the reaction was sufficiently expedited by ref luxing for two hours after the dripping.

Next, the conductive fiber, which bears the hydroxide of platinum obtained by sucking and filtering this fluid dispersion, was thrown into pure water, which was boiled, and after the conductive fiber was rinsed, impurity adhered on the surface which was filtered again was removed.

The conductive particle rinsed and filtered was put into a dryer of 100° C. and dried for 10 hours. The dried conductive particle was introduced into an atmospheric furnace and was heated at 200° C. for 10 hours by flowing a gas of 3% hydrogen—97% nitrogen at 200 ml/min, so that the hydroxide of platinum to be carried on the conductive particle surface was reduced and alloyed.

When the sample was observed by the electron microscope after the reduction, it was confirmed that platinum fine particle as the catalyst for the electrode having an average particle diameter of 1 nm to 3 nm was carried on the wall surface of the carbon.

When X-ray diffraction analysis of this sample was performed, though a crystal of platinum was confirmed, nickel and copper were not confirmed.

Fabrication of the Cathode Electrode

By dispersing 100 g of the carbon nano-fiber, on which platinum was carried, into pure water, the fluid dispersion was prepared, and this fluid dispersion was coated on a porous carbon paper (made by TORAY INDUSTIRES INC.: product name: GPH090) and filtered by the carbon paper so that the conductive fiber was laid up on the carbon paper and, after that, the conductive fiber was dried.

The solution in which the proton conductive material (fluorine system resin having sulfonic group, Nafion: made by Du Pont) was dissolved by 1% was prepared. Next, the sample (the carbon paper on which the conductive fiber is laid up) was vacuum-dipped into this solution (dipping processing). The sample was taken out from the solution and dried in the drier of 100° C. (drying processing). The process comprising this dipping processing and the drying processing was repeated three times so that the proton conductive material was adhered on the conductive fiber surface. Note that before and after the proton conductive material is adhered, weight increase of 30 mg was confirmed and, therefore, it is considered that 30 g of the proton conduction material were adhered.

In this way, the electrode was prepared, wherein the catalytic layer comprising the conductive fibers having two types of particle diameter distribution peaks on which the catalyst was carried and the proton conductive material was formed on the current collector surface.

The thickness of the catalytic layer of the obtained electrode was 300 nm.

When the catalytic layer was observed by the electron microscope, the aggregate of the conductive fibers having a small particle diameter existed by being dispersed in the space of the conductive fibers having a large particle diameter, and the pores existing in the catalytic layer were those having a pore size of about 40 to 60 nm which are formed by the conductive fibers having a small particle diameter and those having a pore size of about 400 to 600 nm which are formed by the conductive fibers having a large particle diameter.

Fabrication of the Fuel Cell

The electrode fabricated as described above was used as a cathode electrode.

In replacement of the conductive fibers, the carbon particles (average aspect ratio 1:1) having an average particle diameter of 100 nm was used, and except for having used a mixture comprising compounds of chroloplatinic acid and Ru in replacement of chroloplatinic acid which is the catalytic material for the electrode and having a composition in such a manner that a ratio of platinum element and ruthenium element is 1:1, the anode electrode was fabricated in the same way as the cathode electrode. The obtained anode catalytic layer is a porous body formed by the carbon particle carrying Pt—Ru alloy, and is a dense layer having a porosity of 20% and an average pore size of about 200 nm, and a film thickness thereof was 100 μm.

The proton conductive film (Nafion 117: made by Du Pont) was held by the cathode electrode and the anode electrode and pressed by a pressure of 100 kg/cm2 at 120° C., thereby fabricating the fuel cell.

Figure 4:
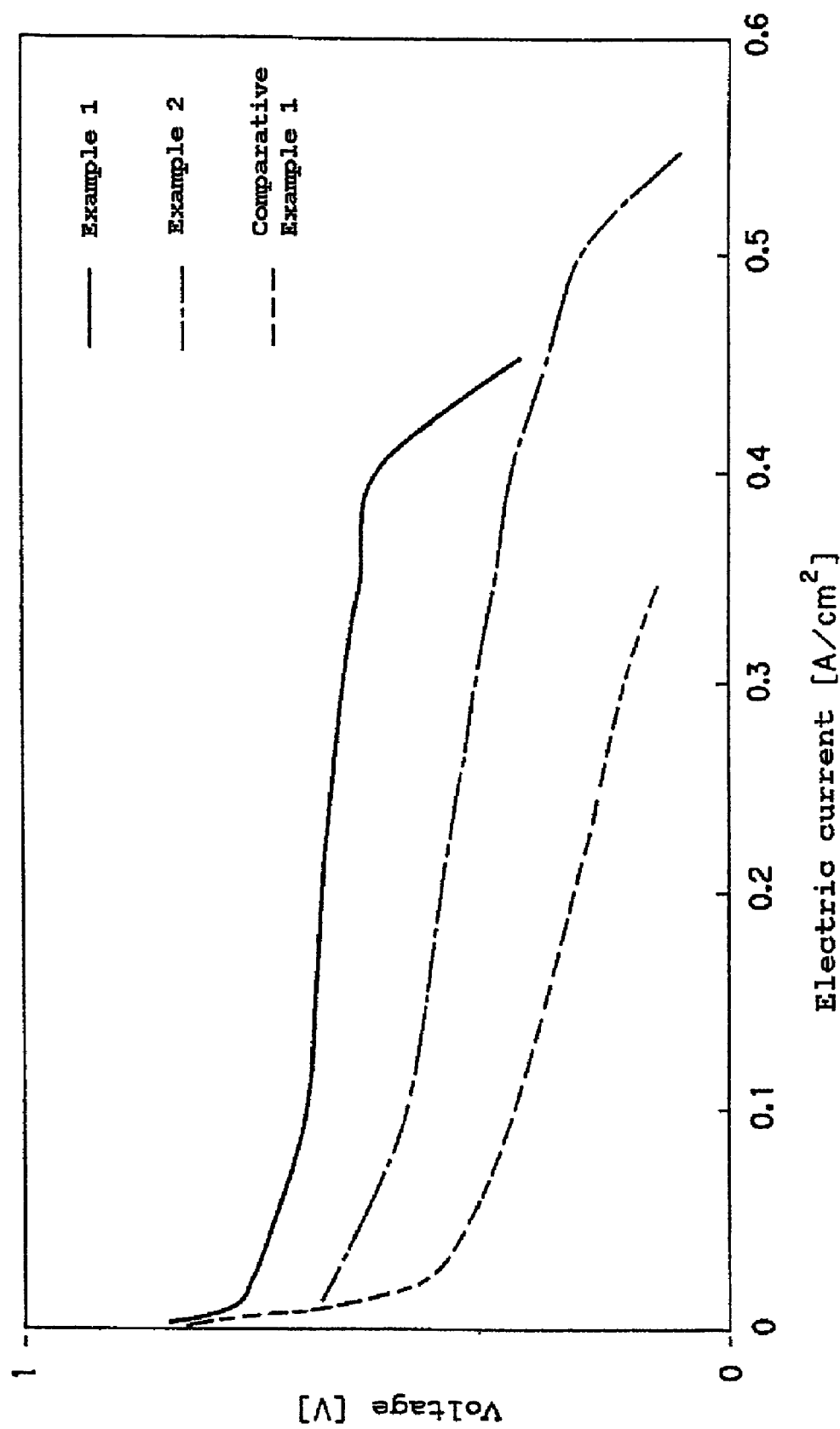
FIG 4 is a characteristic estimation view of a fuel cell obtained by an example.

The anode electrode of the obtained fuel cell was supplied with the liquid fuel comprising methanol and water at 100 ml/min, and the relationship between the voltage generated when oxygen of 500 ml is supplied to the cathode electrode and the current was checked. The result thereof is shown in FIG. 4.

(Embodiment 2)

Formation of the Rough Catalytic Layer

Except for having used a mixture comprising compounds of chroloplatinic acid and ruthenium chloride in replacement of chroloplatinic acid which is the catalytic material for the electrode and having a composition in such a manner that a ratio of platinum element and ruthenium element is 1:1, the anode electrode was fabricated in the same fabricating method as that of the cathode electrode of the embodiment 1. That is, the catalytic layer wherein the catalyst to be carried on the conductive fiber surface of the embodiment 1 is Pt—Ru alloy particle in replacement of platinum particle was formed on the current collector surface, and this catalytic layer was taken as a rough catalytic layer.

Formation of the Dense Catalytic Layer

Except for having used a mixture comprising compounds of chroloplatinic acid and ruthenium chloride in replacement of chroloplatinic acid which is the catalytic material for the electrode and having a composition in such a manner that a ratio of platinum element and ruthenium element is 1:1, and, moreover, using carbon black having an average particle diameter of 70 nm instead of the carbon nano-fiber for the carrier, the catalytic layer (dense catalytic layer) was formed on the carbon paper (substrate for transfer) in the same way as the fabricating method of the anode of the embodiment 1. The obtained catalytic layer was a porous body formed by the carbon particles carrying Pt—Ru alloy and was a dense layer having a porosity of 20% and an average pore size of about 200 nm, and the film thickness thereof was 50 μm.

Next, the same proton conductive film surface as that of the embodiment 1 was prepared, and the dense catalytic layer was transferred on the proton conductive film from above the carbon paper, which is the substrate for transfer. The substrate for transfer was laminated on the proton conductive film through the dense catalytic layer, and by peeling off the carbon paper only from this laminated member, the dense catalytic layer was transferred on the proton conductive film.

When the dense catalytic layer transferred on the proton conductive film surface was observed by the electron microscope, it was a dense layer having a porosity of 20% and an average pore size of about 200 nm, and a thickness thereof was 50 μm.

Fabrication of the Cathode Electrode

The conductive fibers were prepared in the same way as the embodiment 1, and the obtained conductive fibers were classified so that the powders comprising only the conductive fibers (carrier fibers) having a minor axis of 40 nm to 60 nm and a major axis of 1 μm to 5 μm were obtained.

These carrier fibers alone were used as the conductive fibers, and except for having made the amount of the carrier fibers same as the total amount of the conductive fibers in the embodiment 1, the cathode electrode was fabricated in the same way as the embodiment 1. When the catalytic layer of the obtained cathode electrode was observed by the electron microscope, almost all the pore sizes were about 40 nm to 60 nm, and the distribution of the pore size was small.

Fabrication of the Fuel Cell

The current collector in which the rough catalytic layer is formed, the proton conduction film and the cathode electrode (current collector and catalytic layer) in which the dense catalytic layer is formed are laid up so as to be laminated on the current collector/the rough catalytic layer/ the dense catalytic layer/the proton conductive film/the current collector in that order and, after this, this laminated member was thermo-pressed in the same way as the embodiment 1, thereby fabricating the fuel cell.

(Comparative Example 1)

The anode electrode and the proton conductive film used in the embodiment 1 and the cathode electrode used in the embodiment 2 were thermo-pressed in the same way as the embodiment 1, thereby fabricating the fuel cell.

The result of the characteristic estimation of this fuel cell is shown in FIG. 4. When the embodiment 1 and the comparative embodiment 1 are compared, the cathode catalytic layer of the embodiment 1 has a catalytic carrying ratio lowered due to existence of the conductive fibers having a large particle diameter. Nevertheless, gas diffusivity is improved because of the distribution existing in the pore size, and as a result, the service efficiency of the anode electrode was improved and the fuel cell performance was also improved.

The fuel cell of the embodiment 2 and the fuel cell of the comparative embodiment 1 are improved in the output. The reason is that, so far as the crossover of the fuel was diminished, it is common to both of the fuel cells, but in the case of the fuel cell of the embodiment 2, because large pores exist in the anode catalytic layer, the service efficiency of the anode catalyst is improved, thereby also improving the fuel cell performance.

(Embodiment 3)

(1) Fabrication of the Cathode Electrode (a) Fabrication of the Carbon Nano-Fiber As the current collector for the cathode, the carbon paper (made by TORAY INDUSTRIES INC.: TGP-H-030) having a fiber size of 10 µm, a thickness of 10 µm and an area of 100 cm2 was prepared, and Ni as the catalyst for formation was deposited on one side of this carbon paper with a thickness of 100 nm by RF sputtering of 400 W.

The crystal substrate on which this current collector was carried in such a manner that the deposited surface turns into the under surface was introduced into an electric furnace. The temperature inside this electric furnace was maintained at 600° C., and the mixed gas of C2H4 and H2(C2H4/H2-1/5) as a source gas was let flow into this electric furnace at 500 ml/g for one hour, so that the carbon nano-fiber was grown from the catalyst for formation.

After that, it was maintained at 600° C., while C2H4 gas was stopped and H2 gas alone was continuously let flow, and after 30 minutes elapsed, the furnace was cooled.

When the current collector was taken out from the furnace and a weight fluctuation was measured, its weight was increased by 60 mg and it is clear that a layer comprising the carbon nano-fiber having a weight of 6 mmg/cm2 was obtained.

The carbon paper on which the carbon nano-fiber similarly obtained was formed is placed on an undistorted smooth substrate (the carbon paper and the substrate put in parallel), and the carbon paper was observed by the electron microscope. When an angle to the substrate surface of the top portion 10 nm of the obtained carbon nano-fiber was checked, it was confirmed that about 70% of the carbon nano-fibers have grown with an angle of about 90°.

Further, from among the obtained carbon nano-fibers, there exist not less than 80% of those having an average fiber size of 300 nm and a fiber size of 100 nm to 500 nm, and it was confirmed that an average fiber length was 12 µm and a construction thereof was of the platelet construction.

Further, when the carbon nano-fibers only were taken out and the amount of hydrogen inclusion was measured, it was found that hydrogen of 6 wt % was included. Further, when the specific surface area was measured by the BET method, it was 260 m2/g.

(b) Carrying of the Catalyst for the Electrode

The obtained sample of 100 cm2 was divided into ten equal parts to be a sample of 10 cm2 each. This sample was dipped into the acid liquid, and the catalyst for formation was dissolved into the acid liquid and, by washing off the acid liquid, rinsing of the catalyst for formation was performed.

The rinsed sample was dipped into chroloplatinic acid aqueous solution 4 ml (platinum component 21 g/ml) and was boiled for one hour.

After the boiling, alkali aqueous solution which dissolved sodium acid carbonate of 0.40 g in water of about 10 ml was dripped into chroloplatinic acid aqueous solution by spending 30 minutes. After the dripping, it was placed under reflux for two hours as it was, and chroloplatinic acid and alkali aqueous solution were reacted so that hydroxide fine particles of platinum were precipitated out on the carbon nano-fiber surface.

After that, the sample was moved into pure water, and was boiled and rinsed further, and after the rinsing, the sample was moved into the inside of the drier and dried for 12 hours at 100° C.

The dried sample was introduced into the atmospheric furnace, and in a state of the atmospheric furnace inside temperature being set to 300° C., 100% hydrogen was let flow at 200 ml/min, and hydroxide particles of platinum were reduced for one hour so as to be platinized. That is, alloy fine particles as the catalytic particles for the electrode were carried on the carbon nano-fiber surface.

After the reducing, the sample was taken out and the weight thereof was measured and compared with the weight before the platinum fine particles were carried, and when the ratio of platinum carried on the carbon nano-fibers was converted, it was found that platinum of about 5 wt % was carried. Further, when the carbon nano-fiber surface was confirmed in ten visual fields by TEM at magnification of 400 thousands times, it was found that platinum fine particles having an average particle diameter of 2 to 3 nm were carried on the carbon nano-fibers on an average of 1×1016 pcs/m2. Further, when a chemical composition analysis of this fine particle was performed, it was pure platinum of not less than 99%.

Formation of the Proton Conductive Layer

The solution in which fluorine resin (Nafion: made by Du Pont) having sulfonic group which is the proton conductive material was dissolved into organic solution for 2% was prepared.

In vacuo, the electrode catalytic particle carrying carbon nano-fiber was dipped into this solution together with the current collector and, after that, it was taken out and dried at 100 ° C. by the drier. This step was repeated twice so as to adhere a proton conductor on the carbon nano-fiber surface.

The weight change of the current collector (including the carbon nano-fiber and the catalyst for use of the electrode) before and after the imparting of the proton conductor was 20 mg.

Fabrication of the Anode Electrode

The carbon particles (Ketchen black EC made by AKZO NOBEL CORP.) having an average particle diameter of 100 nm were prepared as the catalytic carriers, and the catalytic particles comprising 3 wt % Pt-Ru alloy were carried on the catalytic carrier surface, thereby obtaining a catalytic carrying carbon.

The slurry comprising the solution which dissolved 20% Nafion (made by Du Pont), 2-ethoxyethanol and the obtained catalytic carrying carbon was prepared, and this slurry was coated on the surface of the same current collector as used for the anode electrode and the cathode electrode was prepared.

(3) Fabrication of the Fuel Cell

The electrolyte film (Nafion 117: made by Du Pont) having a film thickness of 170 μm comprising fluorine resin having sulfonic acid was prepared, and this electrolyte film was held by the obtained anode electrode and cathode electrode, and this was integrated by a pressure of 100 kg/cm2, and 100?/° C. thereby preparing the fuel cell.

(4) Estimation

The anode electrode of the obtained fuel cell was supplied with the liquid fuel (methanol density 2 mol/l) comprising methanol and water, and the cathode electrode was supplied with air at 200 ml/min, and the fuel cell was activated and an electric power was generated. Note that the power generating temperature was taken as 70° C.

As a result, an output of 80 mW/cm2 was obtained.

(Comparative Example 2)

Fabrication of the Cathode Electrode

The same carbon particles as those used for the anode of the embodiment 1 were used as the catalytic carriers, and water dispersion in which these carriers were uniformly dispersed in water was prepared, and this water dispersion was added with chroloplatinic acid and, after that, was boiled for one hour.

After the boiling, sodium acid carbonate aqueous solution was dripped into this water dispersion by spending 30 minutes, and was under reflux for two hours as it was, and sodium hydroxide and chroloplatinic acid were reacted so that hydroxide of platinum was precipitated on the carbon particle surface.

After that, the sample was moved into pure water, and was boiled and rinsed further, and after the rinsing, the sample was moved into the inside of the drier and dried for 12 hours at 100° C.

The dried sample was introduced into the atmospheric furnace, and in a state of the atmospheric furnace inside temperature being set to 300° C., 100% hydrogen was let flow at 200 ml/min, and hydroxide particles of platinum were reduced for one hour so as to be platinized. That is, alloy fine particles as the catalytic particles for the electrode were carried on the carbon particle surface.

After the reducing, when the analysis of platinum fine particles was performed in the same way as the embodiment 1, it was found that the amount of platinum for the carbon particles was about 5 wt % and platinum fine particles having an average particle diameter of 3 to 5 nm were carried on the carbon particle surface at a level of 1016 pcs/m2. Further, when a chemical composition analysis of this particle was performed, it was pure platinum of not less than 99%.

Except for having used this cathode electrode, the fuel cell was fabricated in the same way as the embodiment 1, and when the estimation of the fuel cell obtained by the same condition as the example 1 was performed, an output of 40 W/cm2 was obtained.

(Examples 4 to 9 and Comparative Example 3)

Except for the time, the source gas density and the amount of hydrogen, types of the catalysts for formation and removal conditions of the catalysts for formation by rinsing processing at the time when the carbon nano-fibers are formed on the current collection surface, or having changed the reduction temperatures at the time when the catalytic particles for the electrode are fabricated, the cathode electrodes of the examples 2 to 6 and the comparative example 2 were fabricated in the same way as the example 1.

Further, except for having used this cathode electrode, the fuel cell was fabricated in the same way as the embodiment 1 and the estimation thereof was made.

The analytic result of the obtained anode electrode and the estimation result of the fuel cell are shown in Table 1.

TABLE 1

|  | Carbon nano fiber | | | Catalyst particle for electrode | | | |
| --- | --- | --- | --- | --- | --- | --- | --- |
|  | Direction (%) | Specific surface area (m²/g) | Hydrogen content (wt %) | Average particle diameter (nm) | Composition | Porosity (%) | Fuel cell Output (mW/cm²) |
| Example 4 | 70 | 260 | 0.6 | 3 | Pt | 65 | 73 |
| Example 5 | 60 | 300 | 0.55 | 2.5 | Pt-10Ni | 70 | 80 |
| Example 6 | 65 | 260 | 0.57 | 3 | Pt-10Fe | 55 | 70 |
| Example 7 | 70 | 90 | 0.1 | 10 | Pt | 60 | 50 |
| Example 8 | 50 | 300 | 0.5 | 4 | Pt | 20 | 42 |
| Example 9 | 65 | 265 | 0.5 | 10 | Pt | 40 | 60 |
| Comparative example 3 | — | — | 0 | 4 | Pt | 20 | 30 |
| Comparative example 4 | 30 | 250 | 0.5 | 4 | Pt | 20 | 35 |

In the table 1, the "direction(%)" means the ratio of carbon nano-fibers having the top end portion placed at the angle of not less than 45° to the current collector surface to the carbon nano-fibers. And the "porosity" measures a porosity of current collector in which catalyst layer is formed.

From the result of Table 1, it is clear that, from among the carbon nano-fibers which form the catalytic layer, when there exist not less than 50% of those having the top end portion placed at an angle of not less than 45° to the current collector surface, the output of the fuel cell becomes larger.

EFFECT OF THE INVENTION

By using the electrode for the fuel electrode according to the present invention, it is possible to allow the fuel cell to output high power.

Further, according to the present invention, it is possible to enhance the power generation efficiency of the fuel cell.

What is claimed is:

1. An electrode for a fuel cell comprising:
  a film including:
    carbon nano-fibers having particle diameters of 5–1000 nm and an aspect ratio of particle diameter to particle length of from 1:10 to 1:1000;
    aluminum oxide powder;
    fuel cell catalyst carried on a surface of said carbon nano-fibers; and
    ion conductive material.

2. An electrode for a fuel cell comprising:
  a film formed on a current collector, the film including:
    carbon nano-fibers having a particle diameter of 5–1000 nm and an aspect ratio of particle diameter to particle length of from 1:10 to 1:1000;
    aluminum oxide powder;
    fuel cell catalyst carried on the surface of said carbon nano-fibers; and
    ion conductive material.

3. An electrode for a fuel cell comprising:
  a proton electrolyte layer;
  an electrode including a film, the film including:
    carbon nano-fibers formed on opposing surfaces of said proton electrolyte layer, the carbon nano-fibers having a particle diameter of 5–1000 nm and an aspect ratio of particle diameter to particle length of from 1:10 to 1:1000;
    aluminum oxide particles;
    fuel cell catalyst carried on a surface of said carbon nano-fibers; and
    ion conductive material.

4. An electrode for a fuel cell according to claim 1,
  wherein said carbon nano-fibers have two particle diameter distribution peaks of a first particle diameter distribution peak existing at a small particle diameter side and a second particle diameter distribution peak existing at a large particle diameter side, and are formed from the catalyst for formation prepared by process comprising the steps of, preparing a mixed powder comprising one or more reducible metallic oxide power and aluminum oxide powder, mixing and pulverizing said mixed powder, and heating said mixed powder under reducing atmosphere;
  said fuel cell catalyst are carried on said carbon nano-fibers belonging to said first particle diameter distribution peak; and
  said ion conductive material is a proton conductive material adhered on surface of at least said carbon nano-fibers belonging to said first particle diameter distribution peak, so as to come into contact with said fuel cell catalyst.

5. An electrode for a fuel cell according to claim 2, further comprising:
  wherein said carbon nano-fibers have two particle diameter distribution peaks of a first particle diameter distribution peak existing at a small particle diameter side and a second particle diameter distribution peak existing at a large particle diameter side, and are formed from the catalyst for formation prepared by process comprising the steps of, preparing a mixed powder comprising one or more reducible metallic oxide powder and aluminum oxide powder, mixing and pulverizing said mixed powder, and heating said mixed powder under reducing atmosphere;
  said fuel cell catalyst are carried on said carbon nano-fibers belonging to said first particle diameter distribution peak; and
  said ion conductive material is a proton conductive material adhered on surface of at least said carbon nano-fibers belonging to said first particle diameter distribution peak, so as to come into contact with said fuel cell catalyst.

6. An electrode for a fuel cell according to claim 3, further comprising:
  wherein said carbon nano-fibers have two particle diameter distribution peaks of a first particle diameter distribution peak existing at a small particle diameter side and a second particle diameter distribution peak existing at a large particle diameter side, and are formed from the catalyst for formation prepared by process comprising the steps of, preparing a mixed powder comprising one or more reducible metallic oxide powder and aluminum oxide powder, mixing and pulverizing said mixed powder, and heating said mixed powder under reducing atmosphere;
  said fuel cell catalyst are carried on said carbon nano-fibers belonging to said first particle diameter distribution peak; and
  said ion conductive material is a proton conductive material adhered on surface of at least said carbon nano-fibers belonging to said first particle diameter distribution peak, so as to come into contact with said fuel cell catalyst.

7. An electrode for a fuel cell according to claim 3, further comprising:
  transition metal powder and/or alloy powder;
  wherein said transition metal is at least one selected from the group consisting of nickel, copper, and ion;
  said alloy is at least one selected from an alloy of one metal chosen from the group consisting of nickel, copper and iron and the other metal chosen from the group consisting of copper, silver and manganese.

* * * * *